(12) United States Patent
Jaiswal et al.

(10) Patent No.: US 12,470,478 B2
(45) Date of Patent: Nov. 11, 2025

(54) TRAFFIC ROUTING IN BACKUP AND RECOVERY OF NON-ADDRESSABLE HOSTS

(71) Applicant: Rubrik, Inc., Palo Alto, CA (US)

(72) Inventors: Rajesh Kumar Jaiswal, Bangalore (IN); Jiangbin Luo, Cupertino, CA (US); Fan Du, Santa Clara, CA (US)

(73) Assignee: Rubrik, Inc., Palo Alto, CA (US)

( * ) Notice: Subject to any disclaimer, the term of this patent is extended or adjusted under 35 U.S.C. 154(b) by 302 days.

(21) Appl. No.: 18/119,242

(22) Filed: Mar. 8, 2023

(65) Prior Publication Data

US 2024/0305561 A1 Sep. 12, 2024

(51) Int. Cl.
| | |
|---|---|
| *G06F 15/16* | (2006.01) |
| *G06F 9/54* | (2006.01) |
| *H04L 9/40* | (2022.01) |
| *H04L 29/06* | (2006.01) |
| *H04L 45/42* | (2022.01) |
| *H04L 45/741* | (2022.01) |

(52) U.S. Cl.
CPC ............ *H04L 45/42* (2013.01); *H04L 45/741* (2013.01); *H04L 63/166* (2013.01)

(58) Field of Classification Search
CPC ...... H04L 45/42; H04L 45/741; H04L 63/166
USPC ......................................................... 709/238
See application file for complete search history.

(56) References Cited

U.S. PATENT DOCUMENTS

| | | | | |
|---|---|---|---|---|
| 2002/0186698 A1* | 12/2002 | Ceniza | ................ | H04L 12/4641 370/351 |
| 2011/0026531 A1* | 2/2011 | Deutsch | ................ | H04L 63/029 370/395.53 |
| 2013/0315243 A1* | 11/2013 | Huang | ..................... | H04L 12/46 370/392 |
| 2014/0181248 A1* | 6/2014 | Deutsch | .............. | H04L 61/5076 709/217 |
| 2015/0180717 A1* | 6/2015 | Cui | ..................... | H04L 61/5061 370/254 |
| 2016/0283335 A1* | 9/2016 | Yao | ......................... | G06F 16/27 |
| 2020/0036577 A1* | 1/2020 | Bhagvath | ................ | H04L 45/28 |
| 2022/0150160 A1* | 5/2022 | Kumar | .................... | H04L 45/22 |
| 2022/0210005 A1* | 6/2022 | Keane | ................ | H04L 41/0663 |
| 2024/0007441 A1* | 1/2024 | Du | ....................... | H04L 63/0236 |
| 2024/0305561 A1* | 9/2024 | Jaiswal | ................ | H04L 63/166 |

FOREIGN PATENT DOCUMENTS

| | | | | |
|---|---|---|---|---|
| WO | WO-2009055722 A1 * | 4/2009 | ......... | H04L 61/2514 |
| WO | WO-2012044277 A1 * | 4/2012 | .......... | H04L 49/354 |

* cited by examiner

*Primary Examiner* — Hamza N Algibhah
(74) *Attorney, Agent, or Firm* — Holland & Hart LLP

(57) ABSTRACT

Methods, systems, and devices for data management are described. A data management system (DMS) may provide backup and recovery services to one or more non-addressable hosts within a network. The DMS may receive a packet from a host within the network. A source internet protocol (IP) address of the packet, when received at the DMS, may be an IP address associated with the network. The packet may also include an identifier associated with the host. The DMS may include one or more storage entities used to back up the one or more hosts. To route the packet to a storage entity used to back up the host, the DMS may set the source IP address of the received packet to be a virtual IP address associated with the host based on the identifier and use the virtual IP address to route the packet to the storage entity.

20 Claims, 9 Drawing Sheets

TRAFFIC ROUTING IN BACKUP AND RECOVERY OF NON-ADDRESSABLE HOSTS

FIELD OF TECHNOLOGY

The present disclosure relates generally to data management, including techniques for traffic routing in backup and recovery of non-addressable hosts.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
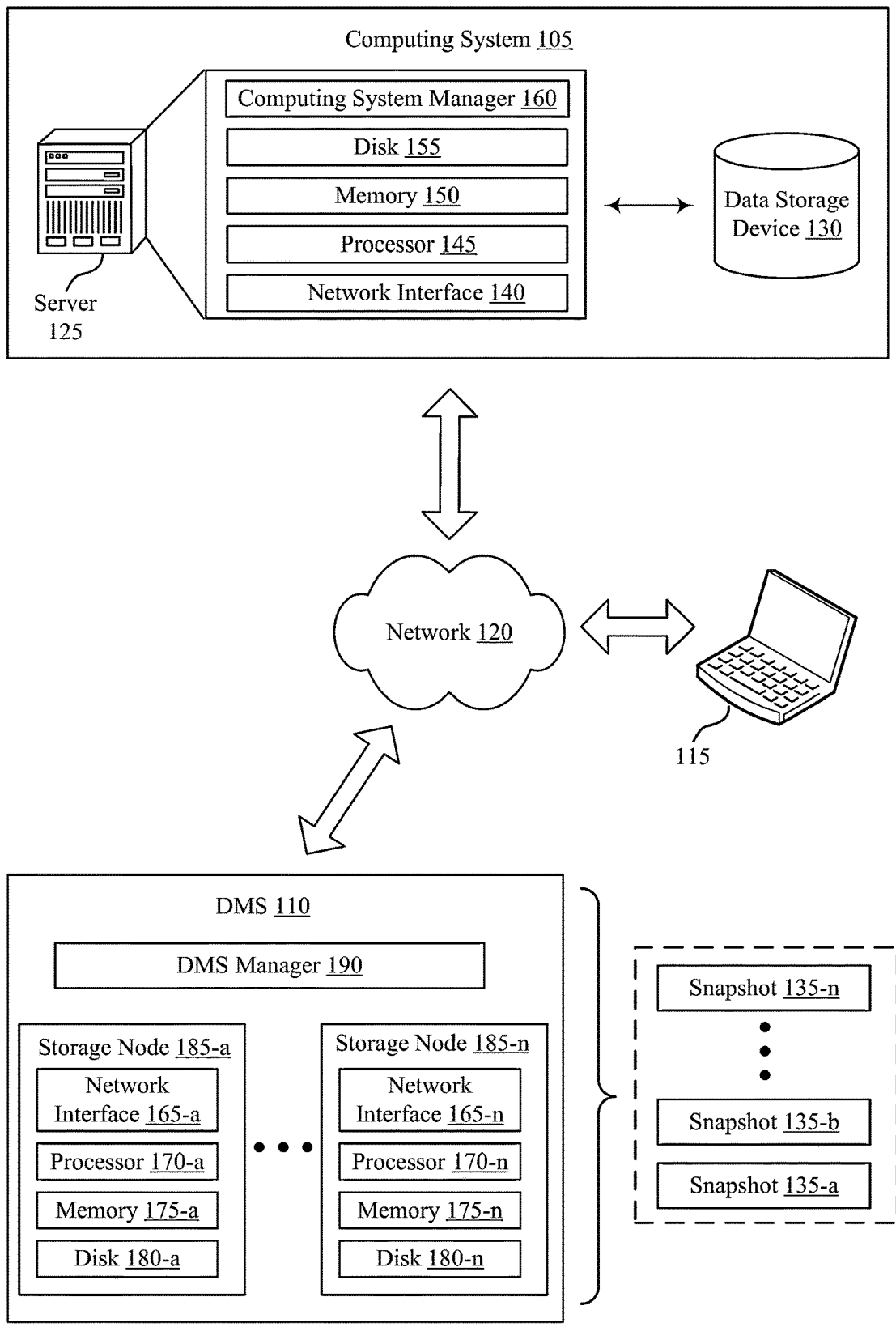
FIGS. 1 and 2 illustrate examples of computing environments that support traffic routing in backup and recovery of non-addressable hosts in accordance with aspects of the present disclosure.

A data management system (DMS) may provide backup and recovery services for data of a computing system. For example, the DMS may facilitate the capture (e.g., generation or ingestion) and storage of snapshots of the computing system (e.g., a computing object of the computing system such as a virtual machine, a database, a filesystem, a virtual disk, a virtual desktop, or other type of computing system or storage system), and the snapshots support later recovery (e.g., restoration) of the computing object.

In accordance with examples described herein, the DMS may provide backup and recovery services to non-addressable computing entities. For example, some computing entities, such as hosts (among others), may be within a private network such that the DMS is unable to directly address the host. For instance, communications (e.g., packets) between the DMS and a computing entity may include internet protocol (IP) addresses to correctly route the communications. However, a non-addressable host within a private network may be associated with an IP address that is not directly reachable by the DMS. That is, the DMS may be unable to reach the host using the IP address (e.g., direct network routes between the DMS and the host may be non-existent or blocked). In cases where the DMS is unable to directly access a non-addressable host of a network (e.g., a private network), a virtual machine may be instantiated (e.g., installed) in the network to support DMS operations. For example, the virtual machine, which may be referred to as an envoy virtual machine, may create a tunnel (e.g., transport layer security TLS tunnel) between itself and the DMS to support communications between the host within the network and the DMS.

In some cases, however, implementation of an envoy virtual machine and TLS tunneling to support communications between the DMS and the network may cause the DMS to be unable to support routing a packet (e.g., a connection request packet) from a host within the network to a corresponding storage entity within the DMS (e.g., a server). For example, the DMS may include multiple storage entities that are each used to backup a corresponding host of the network. The DMS may include a demultiplexing component (e.g., an "Nginx" server) that routes packets from hosts to their corresponding servers based on mapping information that associates the hosts' IP addresses with the corresponding servers. However, if the envoy virtual machine and associated tunnel are used to support communications between the storage entities and hosts, the source IP address of a packet, as received at the DMS, may be dropped and replaced with an IP address associated with the DMS (such as a loopback IP address) as a result of the packet being communicated via the tunnel and forwarded to an appropriate port of the DMS. Accordingly, packets received at the demultiplexing component of the DMS may appear as if they were sent by the DMS itself, which may lead to such packets being dropped by the demultiplexing component, such as because the demultiplexing component may determine that it does not have any mapping information for the apparent source of such packets and may thus be unable to route the packet to a corresponding storage entity.

To support packet routing from non-addressable hosts to corresponding storage entities, the DMS may use virtual IP addresses to appropriately route the packets. For example, the DMS (e.g., at the DMS or via the envoy virtual machine) may allocate a respective virtual IP address to each host within the network. A packet received from a given host may include an identifier of the host. The DMS may use the identifier to identify which host sent the packet and set (e.g., bind) the virtual IP address of the host as the source IP address of the packet (e.g., after the original source IP address of the packet is dropped and instead of the IP address associated with the DMS). The mapping implemented by the demultiplexing component may include mappings from respective virtual IP addresses to corresponding storage entities in accordance with the allocation of the virtual IP addresses. Thus, the packet may be properly routed to a storage entity used to back up the host that sent the packet based on setting the source IP address of the packet to be the virtual IP address of the host. In this way, the DMS may support backup and recovery services for non-addressable hosts, prevention of packet loss from non-addressable hosts, and proper connection establishment between non-addressable hosts and corresponding storage entities used to back up the hosts, among other benefits.

FIG. 1 illustrates an example of a computing environment 100 that supports traffic routing in backup and recovery of non-addressable hosts in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below:

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state-which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the computing system 105 may be included in a network that is separate from a network within which the DMS 110 is located. In some cases, the computing system 105 (e.g., components of the computing system 105) may be associated with an IP address that is not directly reachable by the DMS 110, and thus the DMS 110 may be unable to reach the computing system 105 using the IP address. Here, an envoy virtual machine associated with (e.g., that is considered a part of) the DMS 110 may be instantiated within the network that includes the computing system 105, and the envoy virtual machine may create a tunnel between the networks (e.g., between the envoy virtual machine and the DMS), such that packets may be communicated between the DMS 110 and computing system 105 via the tunnel.

In accordance with examples described herein, the DMS 110 may support traffic routing of packets received from non-addressable computing entities (e.g., computing entities having IP addresses that are not directly reachable by the DMS 110). For example, the DMS 110 may include respective storage entities (e.g., storage nodes 185, servers) that are used to backup respective computing systems 105 (e.g., respective components of the computing system 105, such as respective hosts or servers 125). The DMS 110 may route a packet from a given computing entity to a corresponding storage entity based on a source IP address of the packet. In some cases, a source IP address of a packet received via the tunnel and forwarded to a corresponding port of the DMS 110 may be dropped. To support proper routing to the storage entity when the source IP address is dropped, the DMS 110 may set the source IP address of the packet to be a virtual IP address allocated to the computing entity based on an identifier of the computing entity included in the packet. As such, the DMS 110 (e.g., a demultiplexing component of the DMS 110) may use the virtual IP address to identify the storage entity used to back up the computing entity from which the packet was received and route the packet to the storage entity.

Figure 2:
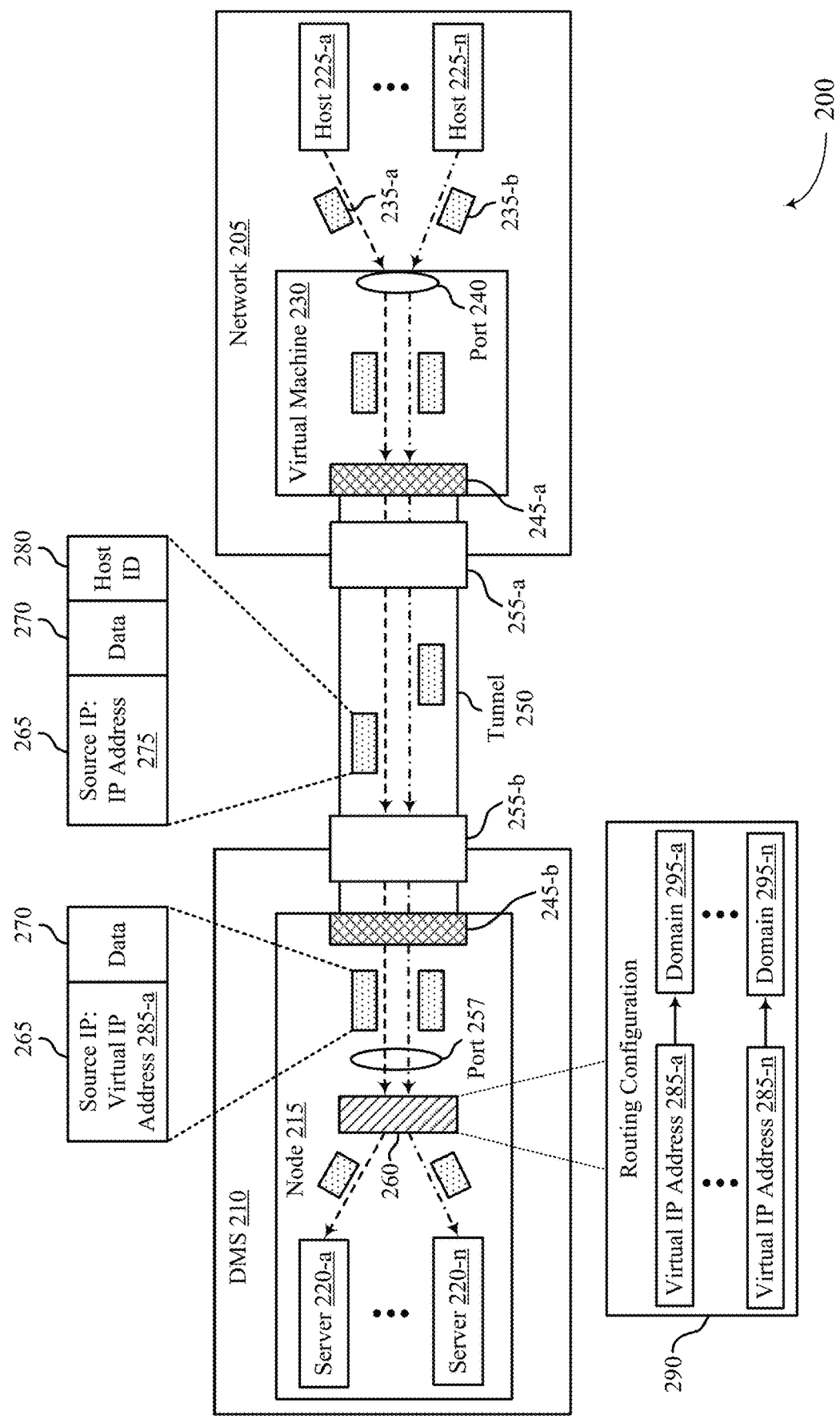

FIG. 2 illustrates an example of a computing environment 200 that supports traffic routing in backup and recovery of non-addressable hosts in accordance with aspects of the present disclosure. The computing environment 200 may implement or be implemented by aspects of the computing environment 100 described with reference to FIG. 1. For example, the computing environment 200 may include a DMS 210, which may be an example of a DMS 110 described herein, including with reference to FIG. 1.

The computing environment 200 may also include a network 205. The network 205 may include various computing entities that are backed up by the DMS 210. For example, the network 205 may include one or more hosts 225 (such as hosts 225-a through 225-n), which may be examples of one or more components of a computing system 105, such as including aspects of a server 125, a data storage device 130, or a combination thereof. In some examples, a host 225 may be a computing entity, such as a hypervisor, that provides underlying hardware resources, such as processing power, memory, network, and storage during virtualization. In some examples, a host 225 may be a bare-metal hypervisor installed directly on the hardware of a physical machine, between the hardware and the operating system. In some examples, a host 225 may be an example of a VMWare host, such as an ESX host or an ESXi host.

The DMS 210 may include various servers 220 that are used to backup respective hosts 225. For example, the DMS 210 may include a server 220-a through a server 220-n that are each used to respectively back up the host 225-a through the host 225-n. That is, packets 235 transmitted by the host 225-a may be routed to the server 220-a that backs up the host 225-a, and so on. In some examples, a server 220 may be an example of a storage node 185 described with reference to FIG. 1. In some examples, a storage node 185 may include multiple servers 220. For example, the DMS 210 may include a node 215 that includes the servers 220. In some examples, the node 215 may be an example of a storage node 185.

The hosts 225 may be non-addressable hosts from the perspective of the DMS 210. That is, the hosts 225 may have respective IP addresses that are not directly reachable by the DMS 210. To support communications between the DMS 210 (e.g., the servers 220), a virtual machine 230 may be instantiated within the network 205. The virtual machine 230 may be an envoy virtual machine that is configured to create a tunnel 250 between the virtual machine 230 and the DMS 210 (e.g., the node 215) via which communications (e.g., packets 235) between the DMS 210 (e.g., the servers 220) and the hosts 225 may be communicated. In some examples, the tunnel 250 may be created between software processes 245 at the virtual machine 230 and the node 215. For example, the virtual machine 230 may use (e.g., implement, execute, run) a software process 245-a, and the node 215 may use a software process 245-b. In some examples, the software processes 245 may support packet forwarding from various sockets via a single secure tunnel, such as the tunnel 250, which may be a TLS tunnel. For example, the software processes 245 may implement TLS tunneling to forward packets via the tunnel 250. In some examples, the software processes 245 may be referred to as TLS tunneling processes.

A packet 235 transmitted by a host 225 to the DMS 210 may be routed via various entities to be received at a corresponding server 220. For example, the host 225-a may access (e.g., establish a connection with, communicate with) the server 220-a by connecting to an IP address (e.g., a live-mountable IP address) associated with the DMS 210 (e.g., the node 215 where the server 220 is running), where the IP address may be included in (e.g., exposed to the host 225-a by) the virtual machine 230. That is, to transmit a packet 235-a to the server 220-a, the host 225-a may transmit (e.g., send, forward) the packet 235-a to the virtual machine 230, and the packet 235-a may include a destination IP address of the IP address associated with the DMS 210. The virtual machine 230 may receive the packet 235-*a* via a port 240, which may be an example of a network file system (NFS) listening port (e.g., port having a port number of 2049) or a server message block (SMB) port (e.g., port having a port number 445), among other ports via which the virtual machine 230 may receive the packet 235-*a*. The virtual machine 230 may transmit (e.g., forward) the packet 235-*a* to the node 215 via the tunnel 250 using the software process 245-*a*.

As part of transmitting the packet 235-*a* to the node 215, the packet 235-*a* may be routed through a translator 255-*a* (e.g., a network address translator (NAT) device) that is configured to translate a source IP address 265 of the packet 235-*a* from an IP address of the host 225-*a* to an IP address 275, which may be an IP address associated with the network 205, such as a public IP address of the network 205 or a private IP address of the network 205. As such, the source IP address 265 of the packet 235-*a* as it is communicated via the tunnel 250 may be the IP address 275 based on being routed through the translator 255-*a*. The packet 235-*a* may also include data 270, which may include the information of the packet 235-*a*, such as a request to establish a connection with the server 220-*a*, information of a snapshot 135, a recovery request (e.g., a restore command) as part of a recovery operation, or a combination thereof, among other possibilities.

The packet 235-*a* may be received at the node 215 via the tunnel 250. In some examples, the packet may be received at the node 215 via a translator 255-*b* (e.g., a NAT device) associated with the node 215 via which the packet 235-*a* is routed. In some examples, the translator 255-*b* may be configured to translate IP addresses for outgoing traffic from the node 215 (e.g., from private IP addresses, such as to the IP address associated with the DMS 210) and for packets received in response to the outgoing traffic. In some examples, the translator 255-*b* may be excluded from the computing environment 200.

The node 215 may use the software process 245-*b* to determine a port of the node 215 to which to forward the packet 235-*a*. For example, the node 215 may include various ports (e.g., virtual points of a network connection) via which different types of traffic may be received. Ports may support the differentiation between different types of traffic, and each port may be reserved for one or more communication protocols. In some examples, communications between the servers 220 and the hosts 225, including packets 235, may be communicated according to (e.g., using) an SMB protocol (among other possible communication protocols). The software process 245-*b* may identify the communication protocol according to which the packet 235-*a* is communicated (e.g., the SMB protocol) and may forward the packet to a port 257 corresponding to the communication protocol. In some examples, the port 257 has a port number of 445.

The node 215 may include a demultiplexer 260 that is configured to monitor for packets 235 received via the port 257 (e.g., listen to SMB connections at port 445) and to route (e.g., forward) the packets 235 to a corresponding server 220 based on a source IP address 265 of the packet 235. For example, the destination IP address of the packet 235 may be the IP address associated with the DMS 210 (e.g., the IP address of the node 215) but may not be specific to the server 220 for which the packet 235 is intended. As such, routing to the proper server 220 may be unsupported using the destination IP address alone. Instead, to route the packet 235 to the proper server 220, the demultiplexer 260 may include a routing configuration 290 that maps respective source IP addresses 265 to respective domains 295 (e.g., domain names) associated with respective servers 220. For example, the DMS 210 may support multiple domains 295, and for each domain 295, a respective server 220 may run (e.g., operate) in a distinct container. The hosts 225 may be associated with respective domains 295 such that traffic from a respective host 225 may be routed to the corresponding server 220 associated with (e.g., supporting) the respective domain 295 via the demultiplexer 260 and in accordance with the routing configuration 290.

As part of forwarding (e.g., routing) the packet 235-*a* to the port 257, the source IP address 265 of the packet 235-*a* may be dropped. For example, after the packet is received at the node 215, the software process 245-*b* may drop the IP address 275 as the source IP address 265 of the packet 235-*a* (e.g., in conjunction with forwarding the packet 235-*a* to the port 257). In some cases, the software process 245-*b* may replace the IP address 275 with an IP address associated with the DMS 210, such as a loopback IP address and forward the packet 235-*a* to the port 257. For example, a default IP address that is used to replace the IP address 275 may be a standard loopback IP address, such as a loopback IP address 127.0.0.1 (e.g., corresponding to a first IP address in the loopback address space) as the forwarding of the packet 235-*a* to the port 257 may be done on the loopback interface. In some examples, the loopback address space may be a reserved IP address (e.g., that starts from 127.0.0.0 and ends at 127.255.255.255) that enables the DMS 210 (e.g., the node 215) to send and receive its own packets.

As a result of the IP address replacement, a source of the packet 235-*a* may appear to be the node 215 itself. However, such replacement of the source IP address 265 may cause the source of packet to be the node 215 itself, and the routing configuration 290 may exclude a mapping from the IP address associated with the DMS 210 to a server 220. Additionally, even if the source IP address 265 were retained as the IP address 275, the IP address 275 may correspond to the network 205 rather than a specific host 225, and the routing configuration 290 may exclude a mapping of the IP address 275 to a server 220. Thus, in either case (e.g., dropping or retaining the IP address 275), any packet 235-*a* received via the port 257 may appear to come from a same source for which a source IP address to domain 295 mapping is excluded from the routing configuration 290. As such, the demultiplexer 260 may be unable to identify to which server 220 to route (e.g., forward) the packet 235-*a* and may drop the packet 235-*a*.

To support routing packets 235 to corresponding servers 220, the DMS 210 may implement virtual IP addresses 285. For example, the DMS 210 may allocate a respective virtual IP address 285 to each host 225 and may use the virtual IP addresses 285 in routing packets 235 received from respective hosts 225 to corresponding servers 220. For instance, the DMS 210 (e.g., the software process 245-*b*) may set the source IP address 265 of the packet 235-*a* to be a virtual IP address 285-*a* allocated (e.g., assigned, corresponding) to the host 225-*a*. The DMS 210 (e.g., the node 215) may generate the routing configuration 290 to map respective virtual IP addresses 285 allocated to respective hosts 225 to respective domains 295. For example, domains 295-*a* through 295-*n* may be associated with servers 220-*a* through 220-*n*, respectively, which may be used to back up the hosts 225-*a* through 225-*n*, respectively. The DMS 210 may allocate virtual IP addresses 285-*a* through 285-*n* to the hosts 225-*a* through 225-*b*, respectively, and the routing configuration 290 may map the virtual IP addresses 285-*a* through 285-*n* to the domains 295-*a* through 295-*n*, respectively, in accordance with the allocation of the virtual IP addresses 285. As such, the demultiplexer 260 may route the packet 235-*a*, having the source IP address 265 set as the virtual IP address 285-*a*, to the server 220-*a* associated with the domain 295-*a* in accordance with the routing configuration 290.

In some examples, the virtual IP addresses 285 may be allocated from the loopback address space. For example, the virtual IP addresses 285 may be IP addresses within the loopback address space such that the loopback interface may be used to forward a packet 235 to the port 257 while differentiating (e.g., identifying) each host 225.

In some examples, the demultiplexer 260 may be an example of an Nginx server, and the routing configuration 290 may be an example of a Nginx configuration file (e.g., an nginx.config file). An example of the routing configuration 290 that implements the virtual IP addresses 285 is included below:

```
geo $remote_addr $backend {
    127.128.1.35 abc.com;
    127.128.2.51 xyz.com;
}
upstream abc.com {
    server 127.0.0.101:1445;
}
upstream xyz.com {
    server 127.0.0.102:1445;
}
server {
    listen 445;
    listen [::]:445;
    proxy_timeout 7d;
    proxy_pass $backend;
}
```

The example routing configuration 290 may include mappings for two virtual IP addresses 285 (e.g., virtual IP address 285-*a* and 285-*n*) to two domains 295 (e.g., domains 295-*a* and 295-*n*) associated with two servers 220 (e.g., servers 220-*a* and 220-*n*). For example, the virtual IP address 127.128.1.35 may be allocated to the host 225-*a*, and the virtual IP address 127.128.2.51 may be allocated to the host 225-*n*. As an example, an IP address of the host 225-*a* (e.g., a private IP address of the host 225-*a*) may be 10.11.1.1, and an IP address of the host 225-*n* may be 10.11.4.154. Thus, the routing configuration 290 may include the virtual IP addresses 285 of the hosts 225 rather than the IP addresses of the hosts 225. In some examples, the IP addresses of the hosts 225 may be routable, while the virtual IP addresses 285 may be unrouteable. That is, the virtual IP addresses 285 may not be IP addresses of computing entities to which a packet may be sent or from which a packet may be received (e.g., over the internet).

The routing configuration 290 may map the virtual IP address 127.128.1.35 to the domain abc.com and the virtual IP address 127.128.2.51 to the domain xyz.com. The routing configuration 290 may also map the domain abc.com to the server having the address 127.01.01.101:1445 (e.g., the server 220-*a*) and the domain xyz.com to the server having the address 127.0.0.102:1445 (e.g., the server 220-*n*). Accordingly, in accordance with the routing configuration 290, the demultiplexer 260 may route a packet 235 having the virtual IP address 127.128.1.35 set as the source IP address 265 to the server 127.0.0.101:1445 and route a packet 235 having the virtual IP address 127.128.2.51 set as the source IP address 265 to the server 127.0.0.102:1445.

To support setting the source IP address 265 of the packet 235-*a* to be the virtual IP address 285-*a*, in addition to including the source IP address 265, the packet 235-*a* may include a host identifier 280 that is an identifier associated with the host 225-*a*. In some examples, the host identifier 280 may be a tenant identifier (e.g., an identifier associated with a tenant network that includes the host 225-*a*) or a network identifier (e.g., an identifier associated with the network 205). Use of a tenant identifier or a network identifier may enable multiple networks to use a same host IP address with the tenant or network identifier indicating the specific host 225 that transmits the packet 235-*a*. In some examples, the host identifier may be a fiber connection identifier.

The host identifier 280 may be used to determine (e.g., select) which virtual IP address 285 to set as the source IP address 265. For example, as described, the IP address 275 may be dropped as the source IP address 265 of the packet 235-*a* at the software process 245-*b*. The software process 245-*b* may use the host identifier 280 included in the packet 235-*a* to determine that the host 225-*a* sent (e.g., is the source of) the packet 235-*a* and may set the source IP address 265 to be the virtual IP address 285-*a* allocated to the host 225-*a* in accordance with the determination. In some examples, to set the source IP address 265 to be the virtual IP address 285-*a*, the software process 245-*b* may bind the virtual IP address 285-*a* to the packet 235-*a* as the source IP address 265. In some examples, the software process 245-*b* may drop the host identifier 280 from the packet 235-*a*. That is, the packet 235-*a* as forwarded by the software process 245-*b* may exclude the host identifier 280.

In some examples, the software process 245-*b* may determine that the host 225-*a* sent the packet 235-*a* based on a mapping between respective host identifiers 280. For example, in some cases, the virtual IP addresses 285 may be allocated to the hosts 225 at the DMS 210 (e.g., at the node 215). That is, the hosts 225 may be unaware of any such virtual IP address allocation and the virtual IP addresses 285 may instead be generated, allocated, and stored at the DMS 210 for use in routing packets from the hosts 225 to corresponding servers 220. Here, the DMS 210 may generate a mapping between respective host identifiers 280 and the virtual IP addresses 285 allocated to the corresponding hosts 225. The software process 245-*b* may use the mapping to determine that the host 225-*a* sent the packet 235-*a* and to select the virtual IP address 285-*a* to set as the source IP address 265.

In some examples, the host identifier 280 may be the virtual IP address 285-*a* allocated to the host 225-*a*. For example, the virtual machine 230 may allocate the respective virtual IP addresses 285 to the respective hosts 225. In some examples, the hosts 225 may be aware of the allocation and may include the allocated virtual IP address 285 in the packet 235-*a* sent to the virtual machine 230. For example, the host 225-*a* may include virtual IP address 285-*a* in the packet 235-*a*, for example, as the host identifier 280. In some examples, the allocation may be internal to the virtual machine 230 (e.g., and indicated to the DMS 210) such that the virtual machine 230 may add (e.g., insert, append) the virtual IP address 285-*a* to the packet 235-*a*, for example, as the host identifier 280 based on receiving the packet from the host 225-*a*. In some examples, the packet 235-*a* may include both the host identifier 280 and the virtual IP address 285-*a*. For example, the virtual machine 230 may use the host identifier 280 to determine the corresponding virtual IP address 285-*a* (e.g., using the mapping between respective host identifiers 280 and virtual IP addresses 285 allocated by the virtual machine 230) and include (e.g., add, insert, append) the virtual IP address 285-*a* in the packet 235-*a* in addition to the host identifier 280. In some examples, the software process 245-*b* may set the virtual IP address 285 included in a packet 235 as the source IP address 265. For example, the software process 245-*b* may set the source IP address 265 of the packet 235-*a* to be the virtual IP address 285-*a* based on (e.g., in response to, in accordance with) the virtual IP address 285-*a* being included in the packet 235-*a*.

In some examples, the virtual IP addresses 285 allocated to the hosts 225 may be within an address range associated with the network 205. For example, the DMS 210 may provide backup and recovery services to hosts 225 within multiple networks 205. To support efficient identification of the network 205 from which a packet 235 is received, the DMS 210 (e.g., the node 215, the virtual machine 230) may allocate virtual IP addresses 285 having respective values that are within the address range associated with the network 205. For example, in the example of the routing configuration 290 above, the virtual IP addresses 285 may have values within the address range "127.128." That is, each virtual IP address 285 may begin with the value "127.128" associated with (e.g., corresponding to, allocated to) the network 205 and may be differentiated by the values following "127.128." In some examples, the address range may be associated with the IP address 275. For example, a portion of the IP address 275 may be used as the address range. In some examples, the address range may be some other address range allocated (e.g., assigned) to the network 205 by the DMS 210.

The server 220-*a* may receive the packet 235-*a* that is routed via the demultiplexer 260. In some examples, the packet 235-*a* may be associated with a connection attempt by the host 225-*a*, and in response to the packet 235-*a*, the server 220-*a* may establish a connection with the host 225-*a* via which additional packets 235 may be communicated (e.g., including snapshot information, such as part of a backup or recovery operation). Similarly, the host 225-*n* may transmit a packet 235-*b* that is routed to the server 220-*n* using a virtual IP address 285-*n* allocated to the host 225-*n*.

Figure 3:
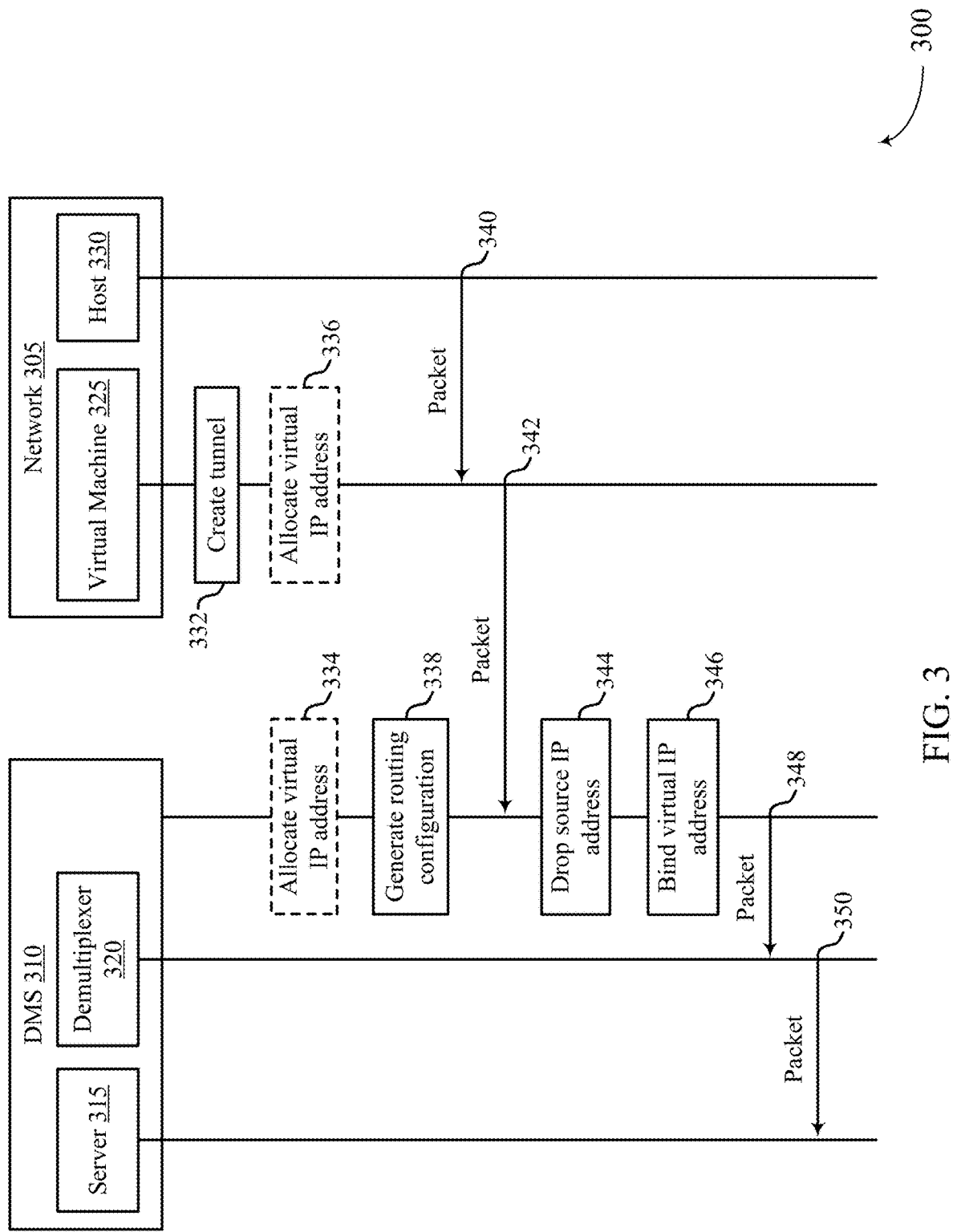
FIG. 3 illustrates an example of a process flow that supports traffic routing in backup and recovery of non-addressable hosts in accordance with aspects of the present disclosure.

FIG. 3 illustrates an example of a process flow 300 that supports traffic routing in backup and recovery of non-addressable hosts in accordance with aspects of the present disclosure. The process flow 300 may implement or be implemented by aspects of the computing environments described with reference to FIGS. 1 and 2. For example, the process flow 300 may be implemented by a network 305 and a DMS 310 to support the routing of a packet using a virtual IP address of a host. The network 305 and the DMS 310 may be examples of the corresponding networks and systems described with reference to FIGS. 1 and 2. The DMS 310 may include a server 315 and a demultiplexer 320 (among other components, software entities, or a combination thereof), which may be examples of a server 220) and a demultiplexer 260 described with reference to FIG. 2. The network may include 305 may include a virtual machine 325 and a host 330, which may be examples of a virtual machine 230 and a host 225 described with reference to FIG. 2.

In the following description of the process flow 300, the operations between the network 305 and the DMS 310 may be performed in a different order than the example order shown, or the operations performed by the network 305 and the DMS 310 may be performed in different orders or at different times. Some operations may also be omitted from the process flow 300, and other operations may be added to the process flow 300. Further, although some operations or signaling may be shown to occur at different times for discussion purposes, these operations may actually occur at the same time.

At 332, the virtual machine 325 may create a tunnel (e.g., a tunnel 250) to support communications between the network 305 and the DMS 310. For example, the tunnel may be a TLS tunnel via which the host 330 may communicate packets with the DMS 310 (e.g., the server 315). In some examples, the tunnel may be between the virtual machine 325 and the DMS 310, such as between software processes at the virtual machine 325 and the DMS 310 that support multiplexing and demultiplexing various network data flows (e.g., to corresponding ports).

At 334, the DMS 310 may allocate (e.g., assign) a virtual IP address to the host 330. In some examples, the DMS 310 may allocate the virtual IP address such that a value of the virtual IP address is within an address range associated with the network 305. In some examples, the DMS 310 may generate and store a mapping between the virtual IP address and an identifier associated with the host 330 to which the virtual IP address is allocated.

At 336, the virtual machine 325 may allocate the virtual IP address to the host 330 (e.g., alternative to the DMS 310 allocating the virtual IP address to the host 330). In some examples, the virtual machine 325 may allocate the virtual IP address such that the value of the virtual IP address is within the address range associated with the network 305. In some examples, the virtual machine 325 may generate and store a mapping between the virtual IP address and an identifier associated with the host 330 to which the virtual IP address is allocated. In some examples, the virtual machine 325 may indicate, to the host 330, the allocation of the virtual IP address to the host 330.

At 338, the DMS 310 may generate a routing configuration (e.g., an Nginx configuration file) that maps allocated virtual IP addresses to corresponding domains. For example, the server 315 used to the back up the host 330 may be associated with a domain (e.g., a domain name). Accordingly, the routing configuration may map the virtual IP address allocated to the host 330 to the domain associated with (e.g., supported by) the server 315. The routing configuration may also indicate the server 315 associated with the domain. For example, the routing configuration may indicate that the upstream server for the domain is the server 315.

At 340, the host 330 may transmit a packet intended for the DMS 310. For example, the packet may include a destination IP address that is an IP address associated with the DMS 310 (e.g., a public IP address of the DMS 310). In some examples, the packet may be or include a request to establish a connection with the DMS 310 (e.g., the server 315, the storage entity used to back up the host 330). The host 330 may transmit the packet to the virtual machine 325.

At 342, the virtual machine 325 may transmit (e.g., forward, send, route) the packet to the DMS 310 via the tunnel. In some examples, the packet may be routed through a translator (e.g., a NAT device) of the network 305. In some examples, a source IP address of the packet, as transmitted by the virtual machine 325, may be an IP address associated with the network 305, such as a private or public IP address of the network 305 (e.g., due to the packet being routed via the translator).

At 344, the DMS 310 may drop the source IP address of the packet. For example, the packet may be received at a software process of the DMS 310 that is configured to route the packet to a corresponding port of the DMS 310 based on the communication protocol according to which the packet is communicated. For instance, the packet may be communicated according to the SMB protocol, and the software process (e.g., a TLS tunneling process) may forward the packet to port 445 of the DMS 310 that is configured for SMB traffic. As part of forwarding the packet to the port 445, the software process may drop the source IP address of the packet (e.g., the source information included in the packet may be lost or dropped).

At 346, the DMS 310 may bind the virtual IP address allocated to the host 330 to the packet as the source IP address of the packet. For example, as part of forwarding the packet to the port 445 (e.g., after the packet is received and the source IP address of the packet is dropped and before the packet is forward to the port 445), the software process may bind the virtual IP address to the packet as the source IP address. In some examples, the DMS 310 (e.g., the software process) may select the virtual IP address using the mapping between the virtual IP address and the identifier associated with the host 330. For example, the packet may include the identifier associated with the host 330, and the software process may use the mapping to determine and select the virtual IP address. In some examples, the packet may include the virtual IP address (e.g., in a separate field of the packet from the source IP address). The software process may determine (e.g., read) the virtual IP address included in the packet and bind (e.g., set) the virtual IP address included in the packet as the source IP address of the packet.

At 348, the DMS 310 (e.g., the software process) may route (e.g., forward, send) the packet to the demultiplexer 320. For example, the demultiplexer may be configured to monitor for traffic communicated via the port 445 and may intercept the packet forward to the port 445 by the software process.

At 350, the demultiplexer 320 may route the packet to the server 315 based on the virtual IP address having been bound as the source IP address of the packet. For example, the demultiplexer 320 may use virtual IP address and the routing configuration to determine the server 315 corresponding to (e.g., used to back up) the host 330 and may route the packet to the server 315 in accordance with the routing configuration.

Figure 4:
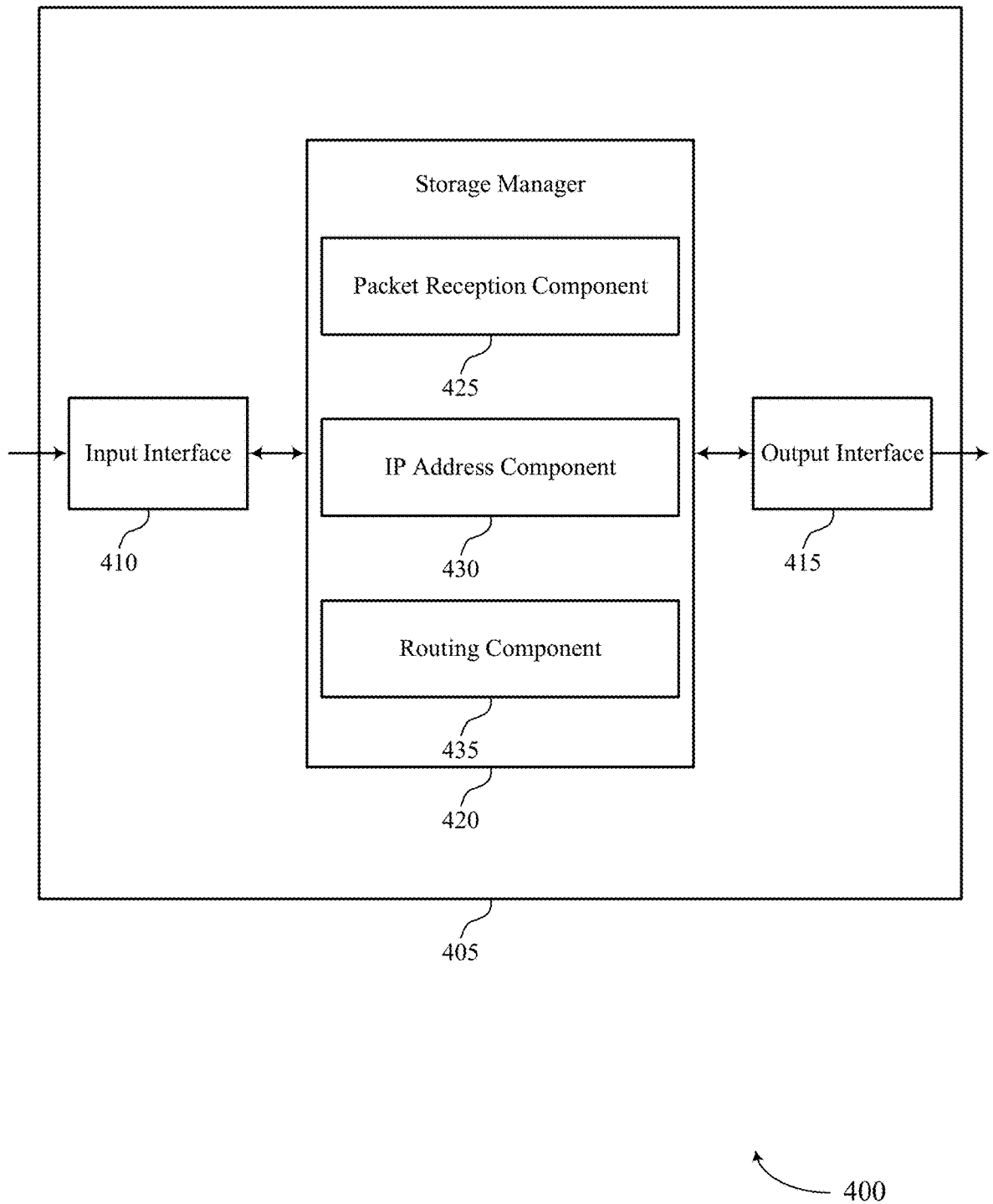
FIG. 4 illustrates a block diagram of an apparatus that supports traffic routing in backup and recovery of non-addressable hosts in accordance with aspects of the present disclosure.

FIG. 4 illustrates a block diagram 400 of a system 405 that supports traffic routing in backup and recovery of non-addressable hosts in accordance with aspects of the present disclosure. In some examples, the system 405 may be an example of aspects of one or more components described with reference to FIGS. 1 through 3, such as a DMS 110, 210, or 310. The system 405 may include an input interface 410, an output interface 415, and a storage manager 420. The system 405 may also include one or more processors. Each of these components may be in communication with one another (e.g., via one or more buses, communications links, communications interfaces, or any combination thereof).

The input interface 410 may manage input signaling for the system 405. For example, the input interface 410 may receive input signaling (e.g., messages, packets, data, instructions, commands, or any other form of encoded information) from other systems or devices. The input interface 410 may send signaling corresponding to (e.g., representative of or otherwise based on) such input signaling to other components of the system 405 for processing. For example, the input interface 410 may transmit such corresponding signaling to the storage manager 420 to support traffic routing in backup and recovery of non-addressable hosts. In some cases, the input interface 410 may be a component of a network interface 625 as described with reference to FIG. 6.

The output interface 415 may manage output signaling for the system 405. For example, the output interface 415 may receive signaling from other components of the system 405, such as the storage manager 420, and may transmit such output signaling corresponding to (e.g., representative of or otherwise based on) such signaling to other systems or devices. In some cases, the output interface 415 may be a component of a network interface 625 as described with reference to FIG. 6.

For example, the storage manager 420 may include a packet reception component 425, an IP address component 430, a routing component 435, or any combination thereof. In some examples, the storage manager 420, or various components thereof, may be configured to perform various operations (e.g., receiving, monitoring, transmitting) using or otherwise in cooperation with the input interface 410, the output interface 415, or both. For example, the storage manager 420 may receive information from the input interface 410, send information to the output interface 415, or be integrated in combination with the input interface 410, the output interface 415, or both to receive information, transmit information, or perform various other operations as described herein.

The storage manager 420 may support data management in accordance with examples as disclosed herein. The packet reception component 425 may be configured as or otherwise support a means for receiving a packet at a DMS (e.g., the system 405), where the packet is from a host that is within a network that includes one or more hosts for which the DMS is configured to provide backup and recovery services, where a source IP address of the packet includes an IP address associated with the network, and where the packet further includes an identifier associated with the host. The IP address component 430 may be configured as or otherwise support a means for setting, after the packet is received at the DMS, the source IP address of the packet to be a virtual IP address associated with the host based on the identifier associated with the host. The routing component 435 may be configured as or otherwise support a means for routing the packet to a storage entity within the DMS that is used to back up the host, where routing the packet to the storage entity is based on the source IP address being set to the virtual IP address associated with the host.

Figure 5:
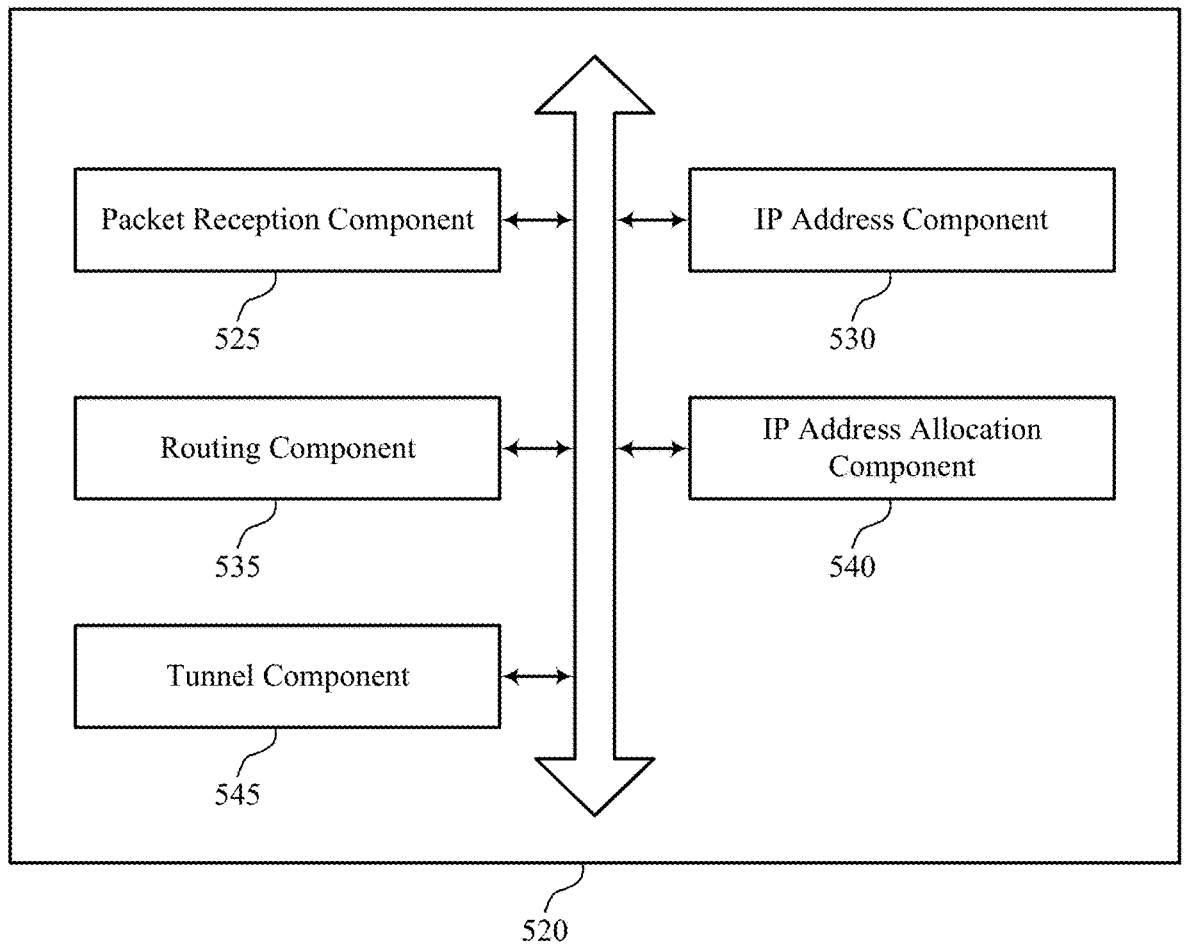
FIG. 5 illustrates a block diagram of a storage manager that supports traffic routing in backup and recovery of non-addressable hosts in accordance with aspects of the present disclosure.

FIG. 5 illustrates a block diagram 500 of a storage manager 520 that supports traffic routing in backup and recovery of non-addressable hosts in accordance with aspects of the present disclosure. The storage manager 520 may be an example of aspects of a storage manager or a storage manager 420, or both, as described herein. The storage manager 520, or various components thereof, may be an example of means for performing various aspects of traffic routing in backup and recovery of non-addressable hosts as described herein. For example, the storage manager 520) may include a packet reception component 525, an IP address component 530, a routing component 535, an IP address allocation component 540, a tunnel component 545, or any combination thereof. Each of these components may communicate, directly or indirectly, with one another (e.g., via one or more buses, communications links, communications interfaces, or any combination thereof).

The storage manager 520 may support data management in accordance with examples as disclosed herein. The packet reception component 525 may be configured as or otherwise support a means for receiving a packet at a DMS, where the packet is from a host that is within a network that includes one or more hosts for which the DMS is configured to provide backup and recovery services, where a source IP address of the packet includes an IP address associated with the network, and where the packet further includes an identifier associated with the host. The IP address component 530 may be configured as or otherwise support a means for setting, after the packet is received at the DMS, the source IP address of the packet to be a virtual IP address associated with the host based on the identifier associated with the host. The routing component 535 may be configured as or otherwise support a means for routing the packet to a storage entity within the DMS that is used to back up the host, where routing the packet to the storage entity is based on the source IP address being set to the virtual IP address associated with the host.

In some examples, the IP address allocation component 540 may be configured as or otherwise support a means for allocating, at the DMS, the virtual IP address to the host. In some examples, the IP address component 530 may be configured as or otherwise support a means for selecting the virtual IP address to set as the source IP address based on a mapping between the identifier associated with the host and the virtual IP address allocated to the host.

In some examples, the tunnel component 545 may be configured as or otherwise support a means for instantiating, within the network, a virtual machine configured to create a tunnel for communications between the DMS and the one or more hosts, where the packet is received via the tunnel. In some examples, the IP address allocation component 540 may be configured as or otherwise support a means for allocating, by the virtual machine, the virtual IP address to the host, where the packet includes the virtual IP address when received at the DMS based on the allocation, and where the source IP address is set to be the virtual IP address based on the packet including the virtual IP address.

In some examples, the identifier associated with the host is the virtual IP address.

In some examples, the IP address allocation component 540 may be configured as or otherwise support a means for allocating one or more virtual IP addresses to the one or more hosts, including the virtual IP address to the host, where respective values of the one or more virtual IP addresses are included within an address range associated with the network.

In some examples, the routing component 535 may be configured as or otherwise support a means for generating a routing configuration that maps respective virtual IP addresses associated with respective hosts included in the one or more hosts to respective domains associated with respective storage entities within the DMS used to back up the respective hosts, where the packet is routed to the storage entity in accordance with the routing configuration.

In some examples, to support setting the source IP address of the packet to be the virtual IP address, the IP address component 530 may be configured as or otherwise support a means for dropping the IP address associated with the network as the source IP address of the packet. In some examples, to support setting the source IP address of the packet to be the virtual IP address, the IP address component 530 may be configured as or otherwise support a means for binding the virtual IP address to the packet as the source IP address of the packet.

In some examples, to support routing the packet to the storage entity, the routing component 535 may be configured as or otherwise support a means for routing the packet using a demultiplexer of the DMS that is configured to monitor a port via which the packet is received at the DMS.

In some examples, to support receiving the packet, the packet reception component 525 may be configured as or otherwise support a means for receiving the packet via a TLS tunnel between the DMS and the network based on the host having an IP address that is not directly reachable by the DMS.

Figure 6:
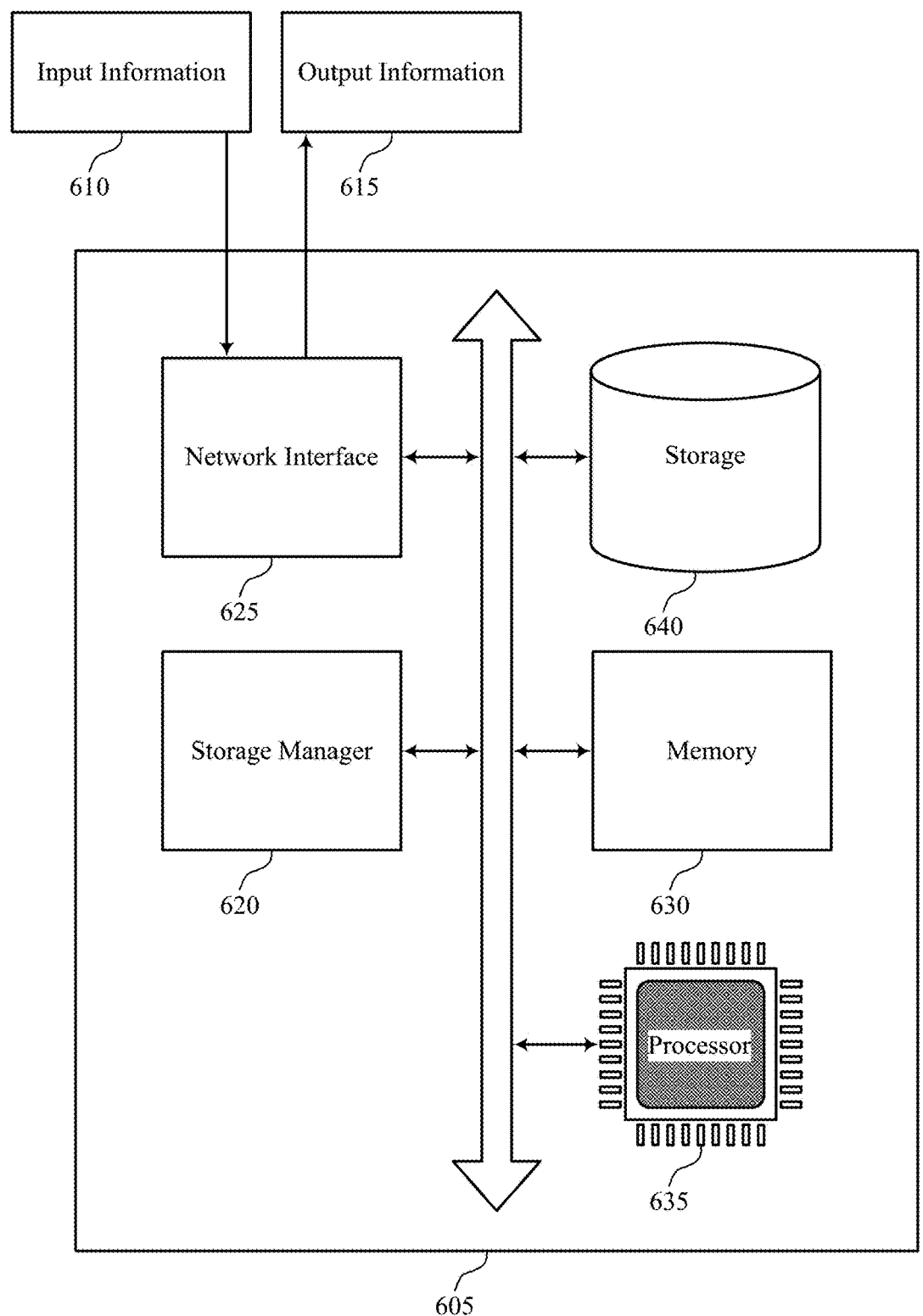
FIG. 6 illustrates a diagram of a system including a device that supports traffic routing in backup and recovery of non-addressable hosts in accordance with aspects of the present disclosure.

FIG. 6 illustrates a block diagram 600 of a system 605 that supports traffic routing in backup and recovery of non-addressable hosts in accordance with aspects of the present disclosure. The system 605 may be an example of or include the components of a system 405 as described herein. The system 605 may include components for data management, including components such as a storage manager 620, an input information 610, an output information 615, a network interface 625, a memory 630, a processor 635, and a storage 640. These components may be in electronic communication or otherwise coupled with each other (e.g., operatively, communicatively, functionally, electronically, electrically; via one or more buses, communications links, communications interfaces, or any combination thereof). Additionally, the components of the system 605 may include corresponding physical components or may be implemented as corresponding virtual components (e.g., components of one or more virtual machines). In some examples, the system 605 may be an example of aspects of one or more components described with reference to FIGS. 1 through 3, such as a DMS 110, 210, or 310.

The network interface 625 may enable the system 605 to exchange information (e.g., input information 610, output information 615, or both) with other systems or devices (not shown). For example, the network interface 625 may enable the system 605 to connect to a network (e.g., a network 120 as described herein). The network interface 625 may include one or more wireless network interfaces, one or more wired network interfaces, or any combination thereof. In some examples, the network interface 625 may be an example of may be an example of aspects of one or more components described with reference to FIG. 1, such as one or more network interfaces 165.

Memory 630 may include RAM, ROM, or both. The memory 630 may store computer-readable, computer-executable software including instructions that, when executed, cause the processor 635 to perform various functions described herein. In some cases, the memory 630 may contain, among other things, a basic input/output system (BIOS), which may control basic hardware or software operation such as the interaction with peripheral components or devices. In some cases, the memory 630 may be an example of aspects of one or more components described with reference to FIG. 1, such as one or more memories 175.

The processor 635 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 635 may be configured to execute computer-readable instructions stored in a memory 630 to perform various functions (e.g., functions or tasks supporting traffic routing in backup of non-addressable hosts). Though a single processor 635 is depicted in the example of FIG. 6, it is to be understood that the system 605 may include any quantity of one or more of processors 635 and that a group of processors 635 may collectively perform one or more functions ascribed herein to a processor, such as the processor 635. In some cases, the processor 635 may be an example of aspects of one or more components described with reference to FIG. 1, such as one or more processors 170.

Storage 640 may be configured to store data that is generated, processed, stored, or otherwise used by the system 605. In some cases, the storage 640) may include one or more HDDs, one or more SDDs, or both. In some examples, the storage 640) may be an example of a single database, a distributed database, multiple distributed databases, a data store, a data lake, or an emergency backup database. In some examples, the storage 640 may be an example of one or more components described with reference to FIG. 1, such as one or more network disks 180.

The storage manager 620 may support data management in accordance with examples as disclosed herein. For example, the storage manager 620 may be configured as or otherwise support a means for receiving a packet at a DMS (e.g., the storage system 605), where the packet is from a host that is within a network that includes one or more hosts for which the DMS is configured to provide backup and recovery services, where a source IP address of the packet includes an IP address associated with the network, and where the packet further includes an identifier associated with the host. The storage manager 620 may be configured as or otherwise support a means for setting, after the packet is received at the DMS, the source IP address of the packet to be a virtual IP address associated with the host based on the identifier associated with the host. The storage manager 620 may be configured as or otherwise support a means for routing the packet to a storage entity within the DMS that is used to back up the host, where routing the packet to the storage entity is based on the source IP address being set to the virtual IP address associated with the host.

By including or configuring the storage manager 620 in accordance with examples as described herein, the system 605 may support techniques for traffic routing in backup and recovery of non-addressable hosts, which may provide one or more benefits such as, for example, backup and recovery services for non-addressable hosts, prevention of packet loss from non-addressable hosts, and proper connection establishment between non-addressable hosts and corresponding storage entities used to back up the hosts, among other possibilities.

Figure 7:
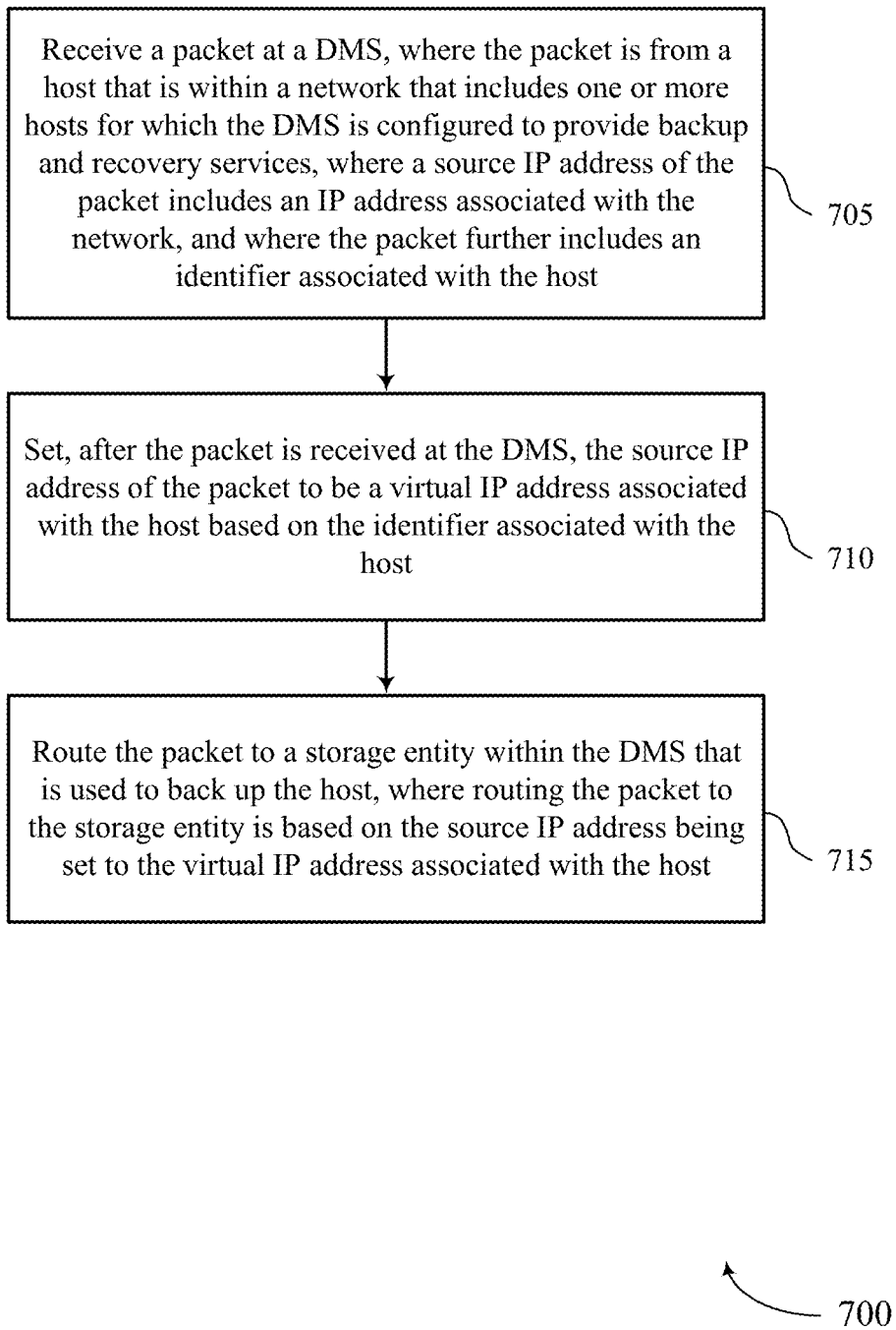
FIGS. 7 through 9 illustrate flowcharts showing methods that support traffic routing in backup and recovery of non-addressable hosts in accordance with aspects of the present disclosure.

FIG. 7 illustrates a flowchart showing a method 700 that supports traffic routing in backup and recovery of non-addressable hosts in accordance with aspects of the present disclosure. The operations of the method 700 may be implemented by a DMS or its components as described herein. For example, the operations of the method 700 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 705, the method may include receiving a packet at a DMS, where the packet is from a host that is within a network that includes one or more hosts for which the DMS is configured to provide backup and recovery services, where a source IP address of the packet includes an IP address associated with the network, and where the packet further includes an identifier associated with the host. The operations of 705 may be performed in accordance with examples as disclosed herein. In some examples, aspects of the operations of 705 may be performed by a packet reception component 525 as described with reference to FIG. 5.

At 710, the method may include setting, after the packet is received at the DMS, the source IP address of the packet to be a virtual IP address associated with the host based on the identifier associated with the host. The operations of 710 may be performed in accordance with examples as disclosed herein. In some examples, aspects of the operations of 710 may be performed by an IP address component 530) as described with reference to FIG. 5.

At 715, the method may include routing the packet to a storage entity within the DMS that is used to back up the host, where routing the packet to the storage entity is based on the source IP address being set to the virtual IP address associated with the host. The operations of 715 may be performed in accordance with examples as disclosed herein. In some examples, aspects of the operations of 715 may be performed by a routing component 535 as described with reference to FIG. 5.

Figure 8:
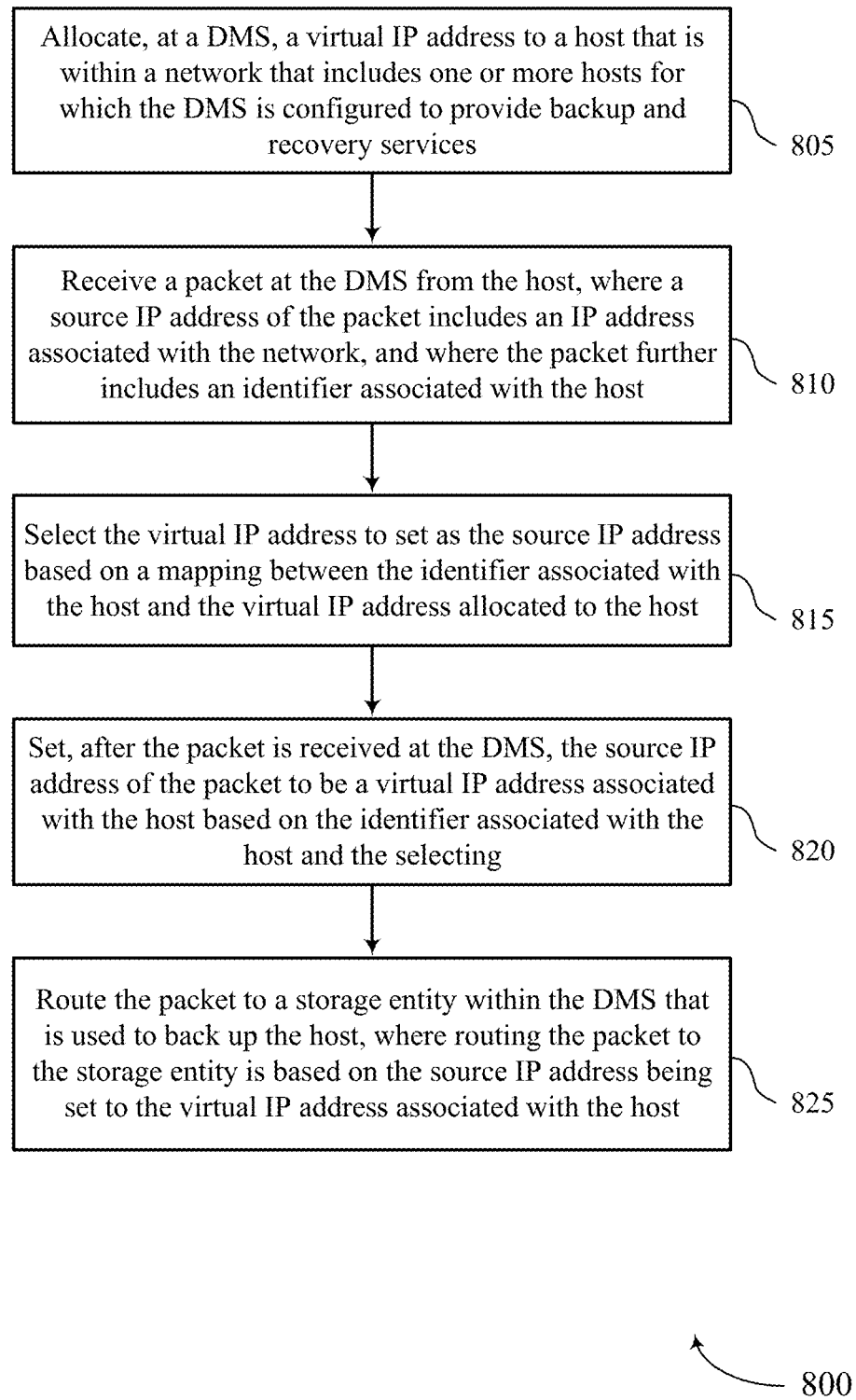

FIG. 8 illustrates a flowchart showing a method 800 that supports traffic routing in backup and recovery of non-addressable hosts in accordance with aspects of the present disclosure. The operations of the method 800 may be implemented by a DMS or its components as described herein. For example, the operations of the method 800 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 805, the method may include allocating, at a DMS, a virtual IP address to a host that is within a network that includes one or more hosts for which the DMS is configured to provide backup and recovery services. The operations of 805 may be performed in accordance with examples as disclosed herein. In some examples, aspects of the operations of 805 may be performed by an IP address allocation component 540 as described with reference to FIG. 5.

At 810, the method may include receiving a packet at the DMS from the host, where a source IP address of the packet includes an IP address associated with the network, and where the packet further includes an identifier associated with the host. The operations of 810 may be performed in accordance with examples as disclosed herein. In some examples, aspects of the operations of 810 may be performed by a packet reception component 525 as described with reference to FIG. 5.

At 815, the method may include selecting the virtual IP address to set as the source IP address based on a mapping between the identifier associated with the host and the virtual IP address allocated to the host. The operations of 815 may be performed in accordance with examples as disclosed herein. In some examples, aspects of the operations of 815 may be performed by an IP address component 530 as described with reference to FIG. 5.

At 820, the method may include setting, after the packet is received at the DMS, the source IP address of the packet to be a virtual IP address associated with the host based on the identifier associated with the host and the selecting. The operations of 820 may be performed in accordance with examples as disclosed herein. In some examples, aspects of the operations of 820 may be performed by an IP address component 530 as described with reference to FIG. 5.

At 825, the method may include routing the packet to a storage entity within the DMS that is used to back up the host, where routing the packet to the storage entity is based on the source IP address being set to the virtual IP address associated with the host. The operations of 825 may be performed in accordance with examples as disclosed herein. In some examples, aspects of the operations of 825 may be performed by a routing component 535 as described with reference to FIG. 5.

Figure 9:
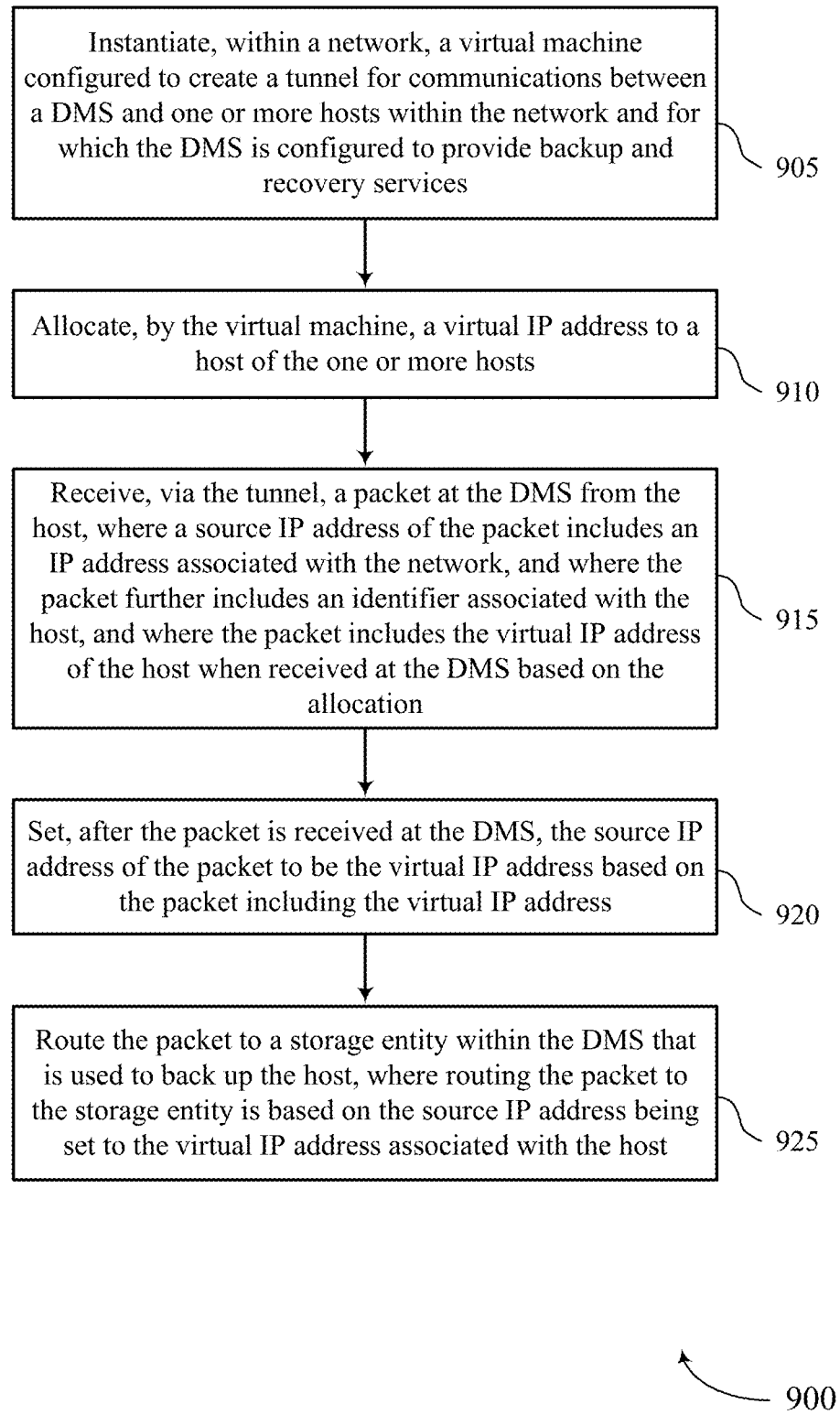

FIG. 9 illustrates a flowchart showing a method 900 that supports traffic routing in backup and recovery of non-addressable hosts in accordance with aspects of the present disclosure. The operations of the method 900 may be implemented by a DMS or its components as described herein. For example, the operations of the method 900 may be performed by a DMS as described with reference to FIGS. 1 through 6. In some examples, a DMS may execute a set of instructions to control the functional elements of the DMS to perform the described functions. Additionally, or alternatively, the DMS may perform aspects of the described functions using special-purpose hardware.

At 905, the method may include instantiating, within a network, a virtual machine configured to create a tunnel for communications between a DMS and one or more hosts within the network and for which the DMS is configured to provide backup and recovery services. The operations of 905 may be performed in accordance with examples as disclosed herein. In some examples, aspects of the operations of 905 may be performed by a tunnel component 545 as described with reference to FIG. 5.

At 910, the method may include allocating, by the virtual machine, a virtual IP address to a host of the one or more hosts. The operations of 910 may be performed in accordance with examples as disclosed herein. In some examples, aspects of the operations of 910 may be performed by an IP address allocation component 540 as described with reference to FIG. 5.

At 915, the method may include receiving, via the tunnel, a packet at the DMS from the host, where a source IP address of the packet includes an IP address associated with the network, and where the packet further includes an identifier associated with the host, and where the packet includes the virtual IP address of the host when received at the DMS based on the allocation. In some examples, the identifier associated with the host included in the packet may be the virtual IP address of the host. The operations of 915 may be performed in accordance with examples as disclosed herein. In some examples, aspects of the operations of 915 may be performed by a packet reception component 525 as described with reference to FIG. 5.

At 920, the method may include setting, after the packet is received at the DMS, the source IP address of the packet to be the virtual IP address based on the packet including the virtual IP address. The operations of 920 may be performed in accordance with examples as disclosed herein. In some examples, aspects of the operations of 920 may be performed by an IP address component 530 as described with reference to FIG. 5.

At 925, the method may include routing the packet to a storage entity within the DMS that is used to back up the host, where routing the packet to the storage entity is based on the source IP address being set to the virtual IP address associated with the host. The operations of 925 may be performed in accordance with examples as disclosed herein. In some examples, aspects of the operations of 925 may be performed by a routing component 535 as described with reference to FIG. 5.

A method for data management is described. The method may include receiving a packet at a DMS, where the packet is from a host that is within a network that includes one or more hosts for which the DMS is configured to provide backup and recovery services, where a source IP address of the packet includes an IP address associated with the network, and where the packet further includes an identifier associated with the host, setting, after the packet is received at the DMS, the source IP address of the packet to be a virtual IP address associated with the host based on the identifier associated with the host, and routing the packet to a storage entity within the DMS that is used to back up the host, where routing the packet to the storage entity is based on the source IP address being set to the virtual IP address associated with the host.

An apparatus for data management is described. The apparatus may include at least one processor, memory coupled with the at least one processor, and instructions stored in the memory. The instructions may be executable by the at least one processor to cause the apparatus to receive a packet at a DMS, where the packet is from a host that is within a network that includes one or more hosts for which the DMS is configured to provide backup and recovery services, where a source IP address of the packet includes an IP address associated with the network, and where the packet further includes an identifier associated with the host, set, after the packet is received at the DMS, the source IP address of the packet to be a virtual IP address associated with the host based on the identifier associated with the host, and route the packet to a storage entity within the DMS that is used to back up the host, where routing the packet to the storage entity is based on the source IP address being set to the virtual IP address associated with the host.

Another apparatus for data management is described. The apparatus may include means for receiving a packet at a DMS, where the packet is from a host that is within a network that includes one or more hosts for which the DMS is configured to provide backup and recovery services, where a source IP address of the packet includes an IP address associated with the network, and where the packet further includes an identifier associated with the host, means for setting, after the packet is received at the DMS, the source IP address of the packet to be a virtual IP address associated with the host based on the identifier associated with the host, and means for routing the packet to a storage entity within the DMS that is used to back up the host, where routing the packet to the storage entity is based on the source IP address being set to the virtual IP address associated with the host.

A non-transitory computer-readable medium storing code for data management is described. The code may include instructions executable by at least one processor to receive a packet at a DMS, where the packet is from a host that is within a network that includes one or more hosts for which the DMS is configured to provide backup and recovery services, where a source IP address of the packet includes an IP address associated with the network, and where the packet further includes an identifier associated with the host, set, after the packet is received at the DMS, the source IP address of the packet to be a virtual IP address associated with the host based on the identifier associated with the host, and route the packet to a storage entity within the DMS that is used to back up the host, where routing the packet to the storage entity is based on the source IP address being set to the virtual IP address associated with the host.

Some examples of the method, apparatuses, and non-transitory computer-readable medium described herein may further include operations, features, means, or instructions for allocating, at the DMS, the virtual IP address to the host and selecting the virtual IP address to set as the source IP address based on a mapping between the identifier associated with the host and the virtual IP address allocated to the host.

Some examples of the method, apparatuses, and non-transitory computer-readable medium described herein may further include operations, features, means, or instructions for instantiating, within the network, a virtual machine configured to create a tunnel for communications between the DMS and the one or more hosts, where the packet may be received via the tunnel and allocating, by the virtual machine, the virtual IP address to the host, where the packet includes the virtual IP address when received at the DMS based on the allocation, and where the source IP address may be set to be the virtual IP address based on the packet including the virtual IP address.

In some examples of the method, apparatuses, and non-transitory computer-readable medium described herein, the identifier associated with the host may be the virtual IP address.

Some examples of the method, apparatuses, and non-transitory computer-readable medium described herein may further include operations, features, means, or instructions for allocating one or more virtual IP addresses to the one or more hosts, including the virtual IP address to the host, where respective values of the one or more virtual IP addresses may be included within an address range associated with the network.

Some examples of the method, apparatuses, and non-transitory computer-readable medium described herein may further include operations, features, means, or instructions for generating a routing configuration that maps respective virtual IP addresses associated with respective hosts included in the one or more hosts to respective domains associated with respective storage entities within the DMS used to back up the respective hosts, where the packet may be routed to the storage entity in accordance with the routing configuration.

In some examples of the method, apparatuses, and non-transitory computer-readable medium described herein, operations, features, means, or instructions for setting the source IP address of the packet to be the virtual IP address may include operations, features, means, or instructions for dropping the IP address associated with the network as the source IP address of the packet and binding the virtual IP address to the packet as the source IP address of the packet.

In some examples of the method, apparatuses, and non-transitory computer-readable medium described herein, operations, features, means, or instructions for routing the packet to the storage entity may include operations, features, means, or instructions for routing the packet using a demultiplexer of the DMS that may be configured to monitor a port via which the packet may be received at the DMS.

In some examples of the method, apparatuses, and non-transitory computer-readable medium described herein, operations, features, means, or instructions for receiving the packet may include operations, features, means, or instructions for receiving the packet via a TLS tunnel between the DMS and the network based on the host having an IP address that may be not directly reachable by the DMS.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for data management, comprising:
   receiving a packet at a data management system, wherein the packet is from a host that is within a network that includes one or more hosts for which the data management system is configured to provide backup and recovery services, wherein the packet includes an indication of a source internet protocol address, wherein, when the packet is received, the source internet protocol address is indicative of the network rather than the host, and wherein the packet further comprises an identifier associated with the host;
   setting, after the packet is received at the data management system, the source internet protocol address of the packet to be a virtual internet protocol address associated with the host based at least in part on the identifier associated with the host;
   routing the packet to a storage entity within the data management system that is used to back up the host, wherein routing the packet to the storage entity is based at least in part on the source internet protocol address being set to the virtual internet protocol address associated with the host; and
   establishing a connection between the host and the storage entity based at least in part on routing the packet to the storage entity in accordance with the virtual internet protocol address, wherein the storage entity is configured to provide the backup and recovery services to the host.

2. The method of claim 1, further comprising:
   allocating, at the data management system, the virtual internet protocol address to the host; and
   selecting the virtual internet protocol address to set as the source internet protocol address based at least in part on a mapping between the identifier associated with the host and the virtual internet protocol address allocated to the host.

3. The method of claim 1, further comprising:
   instantiating, within the network, a virtual machine configured to create a tunnel for communications between the data management system and the one or more hosts, wherein the packet is received via the tunnel; and
   allocating, by the virtual machine, the virtual internet protocol address to the host, wherein the packet comprises the virtual internet protocol address when received at the data management system based at least in part on the allocation, and wherein the source internet protocol address is set to be the virtual internet protocol address based at least in part on the packet comprising the virtual internet protocol address.

4. The method of claim 3, wherein the identifier associated with the host is the virtual internet protocol address.

5. The method of claim 1, further comprising:
   allocating one or more virtual internet protocol addresses to the one or more hosts, including the virtual internet protocol address to the host, wherein respective values of the one or more virtual internet protocol addresses are included within an address range associated with the network.

6. The method of claim 1, further comprising:
   generating a routing configuration that maps respective virtual internet protocol addresses associated with respective hosts included in the one or more hosts to respective domains associated with respective storage entities within the data management system used to back up the respective hosts, wherein the packet is routed to the storage entity in accordance with the routing configuration.

7. The method of claim 1, wherein setting the source internet protocol address of the packet to be the virtual internet protocol address comprises:
   dropping the source internet protocol address indicative of the network as the source internet protocol address of the packet; and
   binding the virtual internet protocol address to the packet as the source internet protocol address of the packet.

8. The method of claim 1, wherein routing the packet to the storage entity comprises:
   routing the packet using a demultiplexer of the data management system that is configured to monitor a port via which the packet is received at the data management system.

9. The method of claim 1, wherein receiving the packet comprises:
   receiving the packet via a transport layer security (TLS) tunnel between the data management system and the network based at least in part on the host having an internet protocol address that is not directly reachable by the data management system.

10. An apparatus for data management, comprising:
    at least one processor;
    memory coupled with the at least one processor; and
    instructions stored in the memory and executable by the at least one processor to cause the apparatus to:
    receive a packet at a data management system, wherein the packet is from a host that is within a network that includes one or more hosts for which the data management system is configured to provide backup and recovery services, wherein the packet includes an indication of a source internet protocol address, wherein, when the packet is received, the source internet protocol address is indicative of the network rather than the host, and wherein the packet further comprises an identifier associated with the host;

set, after the packet is received at the data management system, the source internet protocol address of the packet to be a virtual internet protocol address associated with the host based at least in part on the identifier associated with the host;

route the packet to a storage entity within the data management system that is used to back up the host, wherein routing the packet to the storage entity is based at least in part on the source internet protocol address being set to the virtual internet protocol address associated with the host; and establish a connection between the host and the storage entity based at least in part on routing the packet to the storage entity in accordance with the virtual internet protocol address, wherein the storage entity is configured to provide the backup and recovery services to the host.

11. The apparatus of claim 10, wherein the instructions are further executable by the at least one processor to cause the apparatus to:

allocate, at the data management system, the virtual internet protocol address to the host; and select the virtual internet protocol address to set as the source internet protocol address based at least in part on a mapping between the identifier associated with the host and the virtual internet protocol address allocated to the host.

12. The apparatus of claim 10, wherein the instructions are further executable by the at least one processor to cause the apparatus to:

instantiate, within the network, a virtual machine configured to create a tunnel for communications between the data management system and the one or more hosts, wherein the packet is received via the tunnel; and allocate, by the virtual machine, the virtual internet protocol address to the host, wherein the packet comprises the virtual internet protocol address when received at the data management system based at least in part on the allocation, and wherein the source internet protocol address is set to be the virtual internet protocol address based at least in part on the packet comprising the virtual internet protocol address.

13. The apparatus of claim 12, wherein the identifier associated with the host is the virtual internet protocol address.

14. The apparatus of claim 10, wherein the instructions are further executable by the at least one processor to cause the apparatus to:

allocate one or more virtual internet protocol addresses to the one or more hosts, including the virtual internet protocol address to the host, wherein respective values of the one or more virtual internet protocol addresses are included within an address range associated with the network.

15. The apparatus of claim 10, wherein the instructions are further executable by the at least one processor to cause the apparatus to:

generate a routing configuration that maps respective virtual internet protocol addresses associated with respective hosts included in the one or more hosts to respective domains associated with respective storage entities within the data management system used to back up the respective hosts, wherein the packet is routed to the storage entity in accordance with the routing configuration.

16. The apparatus of claim 10, wherein, to set the source internet protocol address of the packet to be the virtual internet protocol address, the instructions are executable by the at least one processor to cause the apparatus to:

drop the source internet protocol address indicative of the network as the source internet protocol address of the packet; and bind the virtual internet protocol address to the packet as the source internet protocol address of the packet.

17. The apparatus of claim 10, wherein, to route the packet to the storage entity, the instructions are executable by the at least one processor to cause the apparatus to:

route the packet using a demultiplexer of the data management system that is configured to monitor a port via which the packet is received at the data management system.

18. The apparatus of claim 10, wherein, to receive the packet, the instructions are executable by the at least one processor to cause the apparatus to:

receive the packet via a transport layer security (TLS) tunnel between the data management system and the network based at least in part on the host having an internet protocol address that is not directly reachable by the data management system.

19. A non-transitory computer-readable medium storing code for data management, the code comprising instructions executable by at least one processor to:

receive a packet at a data management system, wherein the packet is from a host that is within a network that includes one or more hosts for which the data management system is configured to provide backup and recovery services, wherein the packet includes an indication of a source internet protocol address, wherein, when the packet is received, the source internet protocol address is indicative of the network rather than the host, and wherein the packet further comprises an identifier associated with the host;

set, after the packet is received at the data management system, the source internet protocol address of the packet to be a virtual internet protocol address associated with the host based at least in part on the identifier associated with the host;

route the packet to a storage entity within the data management system that is used to back up the host, wherein routing the packet to the storage entity is based at least in part on the source internet protocol address being set to the virtual internet protocol address associated with the host; and establish a connection between the host and the storage entity based at least in part on routing the packet to the storage entity in accordance with the virtual internet protocol address, wherein the storage entity is configured to provide the backup and recovery services to the host.

20. The non-transitory computer-readable medium of claim 19, wherein the instructions are further executable by the at least one processor to:

allocate, at the data management system, the virtual internet protocol address to the host; and select the virtual internet protocol address to set as the source internet protocol address based at least in part on a mapping between the identifier associated with the host and the virtual internet protocol address allocated to the host.

\* \* \* \* \*